J. Z. LOOP & G. R. J. NEWMAN.
STOCK FEEDER.
APPLICATION FILED JAN. 21, 1909.
940,540.
Patented Nov. 16, 1909.
2 SHEETS—SHEET 1.
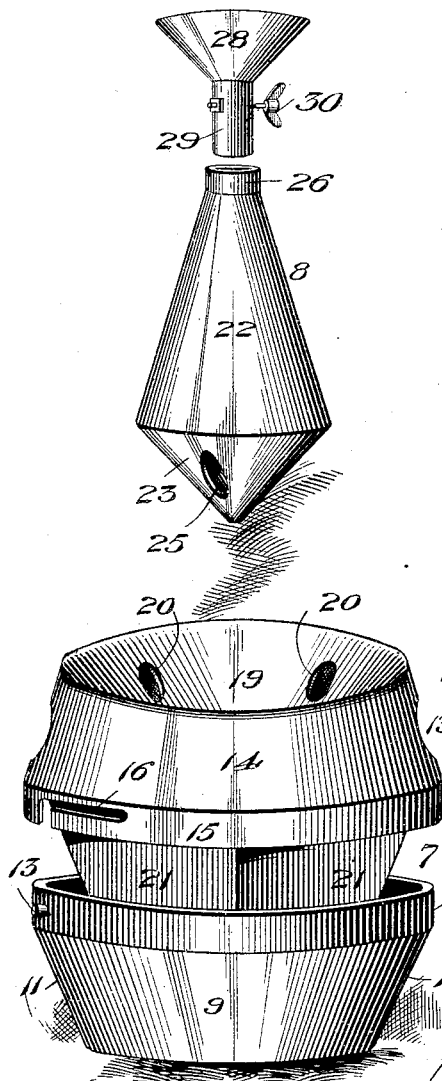
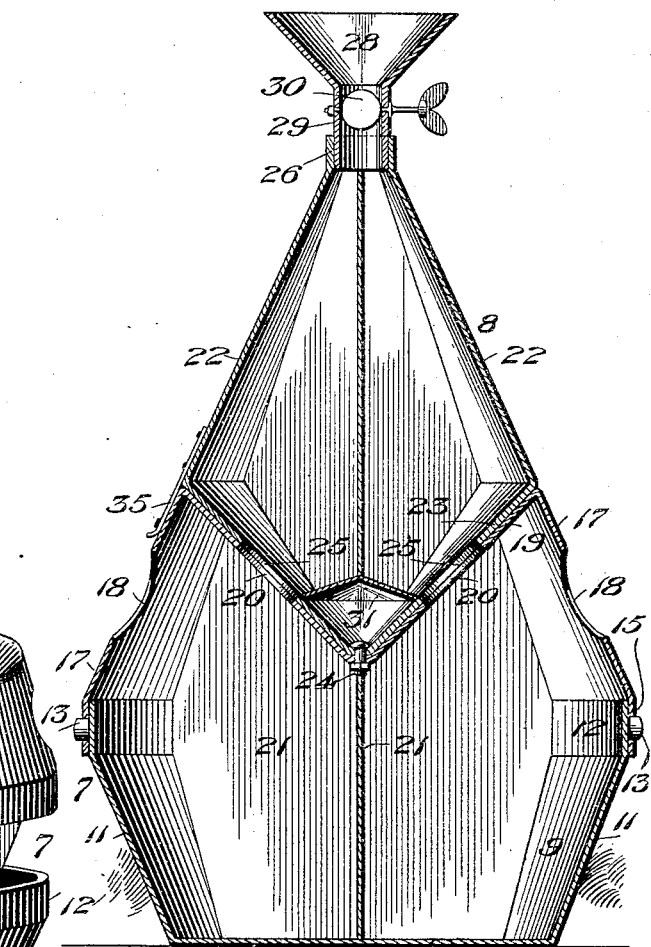
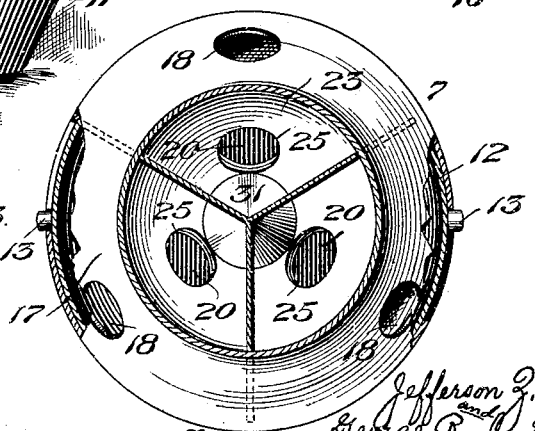
Witnesses
Inventors
Jefferson Z. Loop
George R. J. Newman
By William W. Deane
their Attorney

J. Z. LOOP & G. R. J. NEWMAN.
STOCK FEEDER.
APPLICATION FILED JAN. 21, 1909.

940,540.

Patented Nov. 16, 1909.
2 SHEETS—SHEET 2.

Witnesses

Inventors
Jefferson Z. Loop,
and
George R. J. Newman,
By William W. Deane
their Attorney

UNITED STATES PATENT OFFICE.

JEFFERSON Z. LOOP, OF PHILADELPHIA, PENNSYLVANIA, AND GEORGE R. J. NEWMAN, OF WASHINGTON, DISTRICT OF COLUMBIA.

STOCK-FEEDER.

940,540.  Specification of Letters Patent.  Patented Nov. 16, 1909.

Application filed January 21, 1909. Serial No. 473,591.

*To all whom it may concern:*

Be it known that we, JEFFERSON Z. LOOP and GEORGE R. J. NEWMAN, citizens of the United States, residing, respectively, at Philadelphia, in the county of Philadelphia and State of Pennsylvania, and Washington, District of Columbia, have invented certain new and useful Improvements in Stock-Feeders, of which the following is a specification.

The present invention, while relating more particularly to means for holding feed for fowls, is by no means limited thereto, as it may be successfully employed for feeding animals of various kinds.

One of the primary objects is to provide a device of the above character, which will accurately divide the feed into corresponding portions, so that each fowl or animal can secure its pro rata share.

Another object is to provide a device in which the feed can be preserved in proper condition until feeding time.

Still another and important object is to segregate the portions of feed so that the share of each animal will be entirely separated from the other shares, and the danger of transmitting contagious diseases from one animal to another, through the medium of the feed is materially reduced. In furtherance of this object and supplemental thereto, the aim is also to provide a feeder that can be readily dismembered and thoroughly cleansed, the structure being such that a circulation of air is maintained through it, while the animals are feeding.

Two embodiments of the invention are disclosed in the accompanying drawings and described in the following specification, but it will be evident from an inspection of the claims hereto appended that the said invention is not limited to these two forms of construction.

Figure 4:
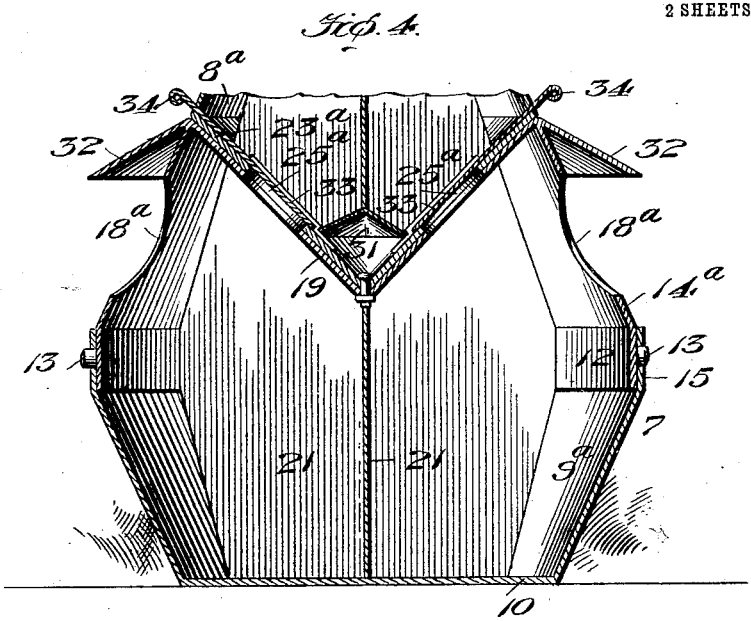
Figure 5:
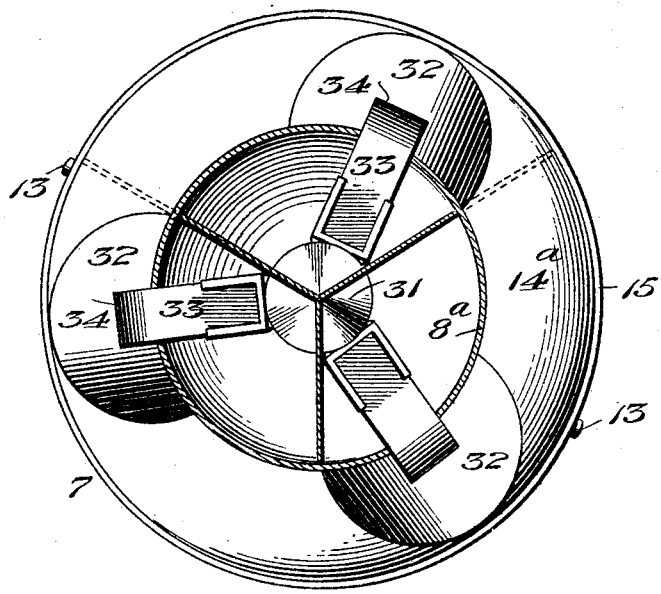
Figure 6:
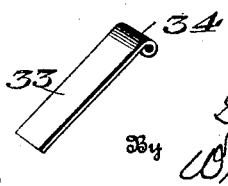

In the drawings:—Figure 1 is a perspective view of one of the preferred embodiments, showing the parts disassociated. Fig. 2 is a vertical sectional view therethrough. Fig. 3 is a horizontal sectional view, with portions broken away. Fig. 4 is a vertical sectional view through a modified form of construction. Fig. 5 is a horizontal sectional view. Fig. 6 is a detail perspective view of one of the controlling slides.

Similar reference numerals designate corresponding parts in all the figures of the drawings.

Referring first to the embodiment disclosed in Figs. 1, 2 and 3, a feeding receptacle 7 and a feed-holding receptacle 8 are employed. The feeding receptacle consists of a body 9 having a flat bottom 10 and circular flared side walls 11 terminating in a substantially vertical rim 12. This rim has outstanding lugs 13. A top element 14 fits upon the body element, being provided with a depending rim 15 that overlaps the rim 12, and has bayonet slots 16 to receive the lugs 13 so that the two elements can be secured together. This top element has an upwardly inclined wall 17 having a plurality of head-receiving openings 18, through which the animals secure their food, as hereinafter described. A top wall 19 is also employed, that is in the form of an inverted cone, and has feed-receiving openings 20. This top element also is provided with a plurality of radial partitions 21 that depend below the same and fit snugly within the body 9 so that when the two elements are together, a plurality of entirely separate feeding chambers are provided, each of which has one head-receiving opening 18 communicating therewith.

The feed-holding receptacle 8 has an upwardly tapered side wall 22 and a conical bottom 23 that is rotatable in the conical top 19 of the feeding receptacle, the two being preferably secured together by a journal bolt 24. The conical bottom has delivery openings 25 that are movable into and out of register with the openings 20 upon the relative rotation of the receptacles, as will be evident. The feed-holding receptacle furthermore has an upstanding vertical neck 26 and has its interior divided into a plurality of separate compartments by radially disposed partitions, the meeting point of which is in line with the center of the neck 26. A funnel 28 has a neck 29 that fits within the neck 26, and a rotary valve 30, journaled in said neck 29, controls the passage of the material into the different compartments of the feed-holding receptacle 8.

In using the device, the food is poured into the funnel 28, and equal portions thereof will consequently pass down into the chambers of the receptacle 8 when the valve 30 is opened. If now the openings 20 and 25 are out of register, the different portions will be maintained in the compartments of said receptacle 8. When feeding time arrives, the two receptacles are relatively rotated, until the openings 20 and 25 are brought into register, whereupon the feed will drop into the different compartments of the feeding receptacle, and can be secured by the animals passing their heads through the openings 18. Preferably a deflector cone 31 is located within the receptacle 8 for directing the material through the openings 25 and 20. With this structure, it will be evident that each fowl or animal has its share of food in a separate compartment from the others, and thus not only can each secure such share, but there is no danger of one animal securing that of the other, and thus contagious diseases cannot be transmitted from one to the other through the medium of the food. As will be evident by reference to Fig. 1, the device can be readily dismembered for the purpose of cleansing. Furthermore when in use, and the openings 20 and 25 are in register, air can circulate freely through the entire structure.

A slightly different form of construction is illustrated in Figs. 4, 5 and 6. In this embodiment, the body 9ª of the feeding receptacle and the top 14ª are of exactly the same construction as in the first described embodiment, with the exception that the latter is shown as provided with hoods 32 arranged over the head-receiving openings 18ª, for the purpose of preventing the entrance of rain water into the chambers. These hoods may or may not be employed on both forms of constructions as desired. The feed-holding receptacle, a portion of which is shown and designated 8ª, has a conical bottom 23ª provided with delivery openings 25ª. The two receptacles may be relatively rotatable, but in this instance, the delivery openings 25ª are also controlled by slides 33 having hand grips 34 disposed exteriorly of the receptacle. By operating these slides, it will be evident that any amount of feed may be delivered, as desired to the different feeding compartments. Furthermore a latch, as 35 may be provided for holding the two receptacles in the desired relative positions.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. In a feeder of the character described, the combination with a feed-holding receptacle having vertical radial partitions forming separate feed-holding chambers, of means for delivering feed simultaneously into the top of the receptacle at the meeting point of the partitions thereof, thereby delivering said feed simultaneously into all of the chambers.

2. In a feeder of the character described, the combination with a feed-holding receptacle having a tapered top provided with a receiving opening, said receptacle having radial partitions thereon that meet in line with the receiving opening, a funnel arranged upon said top and delivering through the receiving opening into all the chambers formed by the partition, and a controlling valve located in the funnel.

3. In a feeder of the character described, the combination with a feeding receptacle having a plurality of interior feeding chambers, of a feed-holding receptacle with separate feed-holding chambers located thereon; said receptacles being relatively movable and having delivery openings movable into and out of register.

4. In a feeder of the character described, the combination with a feeding receptacle having head-receiving openings and having a conical depression provided with feed-receiving openings, of a feed-holding receptacle having a conical bottom, rotatable in the depression and having delivery openings movable into and out of register with the feed-receiving openings.

5. In a feeder of the character described, the combination with a feeding receptacle, having upwardly tapered walls provided with head-receiving openings and having a top in the form of an inverted cone and provided with feed-receiving openings, of a feed-holding receptacle having a conical bottom located in the conical top and provided with feed-delivery openings, said receptacles having radially disposed partitions, and means for feeding material into the top of the feed-holding receptacle.

6. In a feeder of the character described, the combination with a feeding receptacle comprising a body and a top detachably mounted thereon, said top having side walls provided with head-receiving openings and conical depression provided with feed-receiving openings, of radial partition walls carried by the top and depending within the body, a feed-holding receptacle having a conical bottom located in the depression and provided with feed delivery openings, radial partitions arranged within the feed-holding receptacle, and means for controlling the material to be fed into the top of the feed-holding receptacle.

7. In a feeder of the character described, the combination of a feeding receptacle containing feeding chambers and having openings in its top in communication with said feeding chambers, a feed-holding receptacle arranged on the feeding receptacle and covering the openings in the top thereof and having openings in its bottom movable into and out of register with the first named openings, and a connection between the receptacles in the vertical center of both enabling one receptacle to be turned on the other.

8. In a feeder of the character described, the combination of a feeding receptacle containing feeding chambers and having openings in its top in communication with said feeding chambers, a feed-holding receptacle arranged on the feeding receptacle and covering the openings in the top thereof and having openings in its bottom movable into and out of register with the first named openings, means in the feed-holding receptacle for deflecting the feed into the different chambers of the feeding receptacle, and a connection between the receptacles in the vertical center of both enabling one receptacle to be turned on the other.

9. In a feeder of the character set forth, the combination with a feeding receptacle having radial partitions entirely inclosed within the same to form separate feeding-chambers, of a feed-holding receptacle located thereon, means for controlling the passage of feed from the holding receptacle to the different feeding-chambers, and means in the feed holding receptacle for deflecting the feed into the different feeding-chambers of the feeding receptacle.

10. In a feeder of the character described, the combination with a feeding receptacle having a plurality of interior feeding chambers, of a feed-holding receptacle with interior feed-holding chambers located thereon; said receptacles being relatively rotatable, the bottom of the upper receptacle and the top of the lower receptacle having openings that are movable into and out of register, and deflecting means for said openings carried by the feed-holding receptacle.

11. A feeder of the character described, comprising separable body and top elements, partitions located within said elements and carried by one of the same, one of said elements having feed openings between the partitions, and head-receiving openings arranged below the feed openings in one of the elements.

12. A feeder of the character described, comprising separable body and top elements, partitions located within one of said elements, feed openings arranged between the partitions of said element, and head-receiving openings located below the feed openings in one of said elements.

13. A feeder of the character described, comprising a feeding receptacle the upper portion of which is tapered upwardly and is provided with head-receiving openings and with hoods disposed above said openings, partitions in said receptacle, an upwardly tapered feed-holding receptacle superposed on the feeding receptacle; the opposed walls of the receptacles having openings movable into and out of register with each other, and a connection arranged in the center of said receptacles whereby one is rotatable relatively to the other.

14. In a feeder of the character described, the combination with a feeding receptacle having a plurality of interior feeding chambers, of a feed-holding receptacle located thereon and having separate feed-holding chambers; said receptacles being relatively movable and having delivery openings movable into and out of register, and means for controlling the openings separately.

15. In a feeder of the character described, the combination with a feeding receptacle having partitions entirely inclosed within the same to form separate feeding-chambers, of a feed holding receptacle located thereon with separate interior feed-holding chambers; said receptacles being relatively movable and having delivery openings movable into and out of register, and deflecting means for said delivery openings.

16. In a feeder of the character described, the combination with a feeding receptacle having partitions entirely inclosed within the same to form separate feeding-chambers, of a feed-holding receptacle located thereon with a plurality of feed-holding chambers, means for controlling the passage of feed from the various chambers of the holding-receptacle to the different feeding-chambers, and means in the feed holding receptacle for deflecting the feed into the several feeding-chambers.

In testimony whereof we affix our signatures in presence of two witnesses.

JEFFERSON Z. LOOP.
GEORGE R. J. NEWMAN.

Witnesses:
A. L. HOUGH,
WM. W. DEANE.